2,833,755

PREPARATION OF POLYOLEFINS OF IMPROVED COLOR BY CATALYTIC POLYMERIZATION WITH A TITANIUM TETRAALKOXIDE AND A MONOALKYL ALUMINUM DIHALIDE

Harry W. Coover, Jr., Kingsport, Tenn., assignor to Eastman Kodak Company, Rochester, N. Y., a corporation of New Jersey No Drawing. Application November 29, 1955
Serial No. 549,860

15 Claims. (Cl. 260—93.7)

This invention relates to a new and improved polymerization process and is particularly concerned with the use of a novel catalyst combination for preparing high molecular weight solid polyolefins, and particularly polyethylene, of high density and crystallinity and improved color. In particular, the invention is concerned with the preparation of polyethylene having an average crystallinity of more than 80% and a density above 0.945 using a particular catalyst combination which has unexpected catalytic activity and which gives products of better color than can be obtained by closely related catalyst mixtures.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this same aluminum triethyl is used in conjunction with a titanium tetraalkoxide, such as titanium tetrabutoxide, the mixture does not produce solid polyethylene for some reason which is not apparent.

It is thus apparent that the catalytic polymerization of α-monoolefins depends upon specific catalyst combinations. Furthermore, certain catalyst combinations which are effective in forming solid polyethylene do not give polymers having the desired color characteristics. Instead, highly colored polymers are often obtained.

This invention is concerned with and has for an object the provision of improved processes whereby α-monoolefins and particularly ethylene can be readily polymerized by catalytic means to give high molecular weight, highly crystalline polymers of improved color characteristics. A particular object of the invention is to provide an improved catalyst combination which has unexpected catalytic activity and combines this catalytic activity with low color formation during polymerization. Other objects will be apparent from the description and claims which follow.

These and other objects are attained by means of this invention, wherein α-monoolefins, either singly or in admixture, are readily polymerized to high molecular weight solid polymers of excellent color by effecting the polymerization in the presence of a catalytic mixture of a titanium tetraalkoxide wherein each alkoxide group contains 1–4 carbon atoms and a monoalkyl aluminum dihalide wherein the alkyl group contains 1–12 carbon atoms and the halide is either a chloride or a bromide. In the process of this invention, the molar ratio of the components of the catalyst mixture is in the range of from 1:4 to 4:1. Although titanium tetrabutoxides are completely ineffective to form solid polyolefin when employed in conjunction with trialkyl aluminum, such titanium alkoxides are highly effective when employed in combination with monoalkyl aluminum dihalides as described herein. This catalytic activity was thus wholly unexpected, particularly since the monoalkyl aluminum dihalides had not been known to possess any comparable degree of catalytic activity to the dialkyl aluminum monohalides or the trialkyl aluminums. For some reason which is not apparent, the titanium alkoxides also give much less color formation in the polymer than does a titanium tetrahalide such as titanium tetrachloride. The inventive process is carried out in liquid phase in an inert organic liquid and preferably an inert liquid hydrocarbon vehicle. The process proceeds with excellent results over a temperature range of from 10° C. to 200° C., although it is preferred to operate within the range of from about 25° C. to about 130° C. Likewise, the reaction pressures may be varied widely from about atmospheric pressure to very high pressures of the order of 20,000 p. s. i. or higher. A particular advantage of the invention is that at temperatures of from 10° to 200° C., pressures of the order of 20–700 p. s. i. give excellent results, and it is not necessary to employ the extremely high pressures which were necessary heretofore. The liquid vehicle employed is desirably one which serves both as a liquid reaction medium and as a solvent for the solid polymerization products at the temperature of polymerization.

The invention is of particular importance in the preparation of highly crystalline polyethylene, although it can be used for polymerizing propylene or mixtures of ethylene and propylene as well as other α-monoolefins containing 1–10 carbon atoms. The polyethylene which is obtained in accordance with this invention has a softening or fusion point greater than 130° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but are partially soluble in such solvents as xylene, toluene or tetralin at temperatures about 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

A highly valuable characteristic of the polyethylene prepared by means of this invention is its low degree of coloration whereby the polymer has a milky appearance in thick section and a clear appearance in thin section. No objectionable formation of brown color results from the process embodying this invention. This improved polyethylene, when exhibiting a molecular weight in the range of about 50,000, exhibits a density above 0.95, a softening temperature of at least 130° C., a tensile strength of 3000–5500 p. s. i. and a stiffness in flexure at 5% deflection of at least 50,000 p. s. i.

The polyethylene prepared in accordance with the invention can be molded or extruded and can be used to form plates, sheets, films, or a variety of molded objects which exhibit a higher degree of stiffness than do the corresponding high pressure polyethylenes. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyethylene obtained according to this process. Other poly-α-olefins as well as copolymers of ethylene and propylene can also be prepared and have similarly improved properties.

As has been indicated, the improved results obtained in accordance with the invention depend upon the particular combination of catalytic components which are employed. Thus the titanium tetraalkoxide can be titanium tetramethoxide, titanium tetraethoxide, titanium tetrapropoxide, or titanium tetrabutoxide, with the butoxides being preferred in most cases. Similarly, the monoalkyl aluminum dichloride or dibromide can be any of the compounds wherein the alkyl group contains from 1 to 12 carbon atoms. Thus the alkyl group can be methyl, ethyl, n-propyl, isopropyl, n-butyl, octyl, hexyl, dodecyl, or the like with excellent results, although the lower alkyl groups are preferred for convenience.

The limiting factor in the temperature of the process appears to be the decomposition temperature of the catalyst. Ordinarily temperatures from 25° C. to 130° C. are employed, although temperatures as low as —60° C. or as high as 200° C. can be employed if desired. Usually, it is not desirable or economical to effect the polymerization at temperatures below —20° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses. The catalyst mixture is readily soluble in the usual organic liquid vehicles and hence the uniformity of reaction can be readily controlled.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 700 p. s. i. obtained by pressuring the system with the monomer being polymerized. The amount of vehicle employed can be varied over rather wide limits with relation to the monomer and catalyst mixture. Best results are obtained using a concentration of catalyst of from about 0.1% to about 4% by weight based on the weight of the vehicle. The concentration of the monomer in the vehicle will vary rather widely depending upon the reaction conditions and will usually range from about 2 to 50% by weight or preferably from about 2 to about 10% by weight based on the weight of the vehicle. Concentrations of monomer in the vehicle of about 3–7% by weight are commonly employed. Higher concentrations of monomer ordinarily increase the rate of polymerization, but concentrations above 5–10% by weight are ordinarily less desirable because the polymer dissolved in the reaction medium results in a very viscous solution.

The molar ratio of the monoalkyl aluminum dihalide to the titanium tetraalkoxide can be varied anywhere within the range of from 1:4 to 4:1. Generally, the concentration of the monoalkyl aluminum dihalide is preferably at least equal to that of the titanium tetraalkoxide or greater. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

*Example 1*

In a dry 500-cc. pressure bottle were placed 100 ml. of dry heptane, 2 g. of aluminum methyl dibromide, and a molecular equivalent of titanium tetrabromide. The pressure vessel was then flushed with nitrogen and attached to an ethylene source at 30 p. s. i., gauge pressure. The reaction mixture was shaken at room temperature for 2 hours, after which the temperature was elevated at 90° C. and maintained at this temperature with agitation for 3 hours. The product was filtered from the reaction vehicle, washed with ethanol 3 times and then washed 3 times with water. The yield of highly crystalline, high molecular weight polyethylene was 27 g. The polymer had an inherent viscosity of about 1.1. The polymer was of a milky white color, showed a density above 0.945 and a softening point above 130° C. In appearance, it was the equal of the best commercial class of high pressure polyethylene and exhibited a higher degree of rigidity than was characteristic of the high pressure polyethylenes.

The unexpected nature of this catalytic polymerization is illustrated by the fact that the same procedure was followed using 2 g. of aluminum triethyl and a molecular equivalent of titanium tetrabutoxide as the catalyst mixture. Under the same reaction conditions, no polyethylene was produced using this mixture.

*Example 2*

A continuous process for polymerization of ethylene was effected by continuously feeding through a tubular reactor a solution of ethylene in heptane containing about 4% of aluminum methyl dichloride based on the weight of heptane and about an equimolar amount of titanium tetrabutoxide. The reaction was carried out at a substantially constant temperature of about 110° C. A good yield of highly crystalline polyethylene was obtained continuously by this process. Similar results were obtained with other catalyst combinations and concentrations as defined herein.

*Example 3*

A pressure reactor was charged with 100 parts by volume of heptane containing 4% by weight of aluminum methyl dichloride and titanium tetraethylate amounting to four times the molar amount of the aluminum compound. The pressure reactor was pressured to 30 p. s. i. with ethylene, and the polymerization was effected at room temperature for 72 hours. The yield of high molecular weight, highly crystalline polyethylene was 11 parts by weight.

*Example 4*

Ethylene was polymerized in heptane at 150 p. s. i. and 130° C. in one hour using 0.5% by weight of aluminum butyl dichloride in a ratio of 2 molecular equivalents of the aluminum compound to 1 of titanium tetrabutoxide. The solid polymer thereby obtained corresponded in characteristics to that obtained according to Example 1.

*Example 5*

Although the process of the invention permits the polymerization to be effected at relatively low pressures, the process can be carried out at very high pressures if desired. Thus, ethylene was polymerized in heptane solution in an autoclave at 20,000 p. s. i. and a temperature of 200° C. using equimolar proportions of aluminum ethyl dichloride and titanium tetraethoxide. The concentration of the aluminum compound was 4% based on the weight of the heptane, and after a reaction period of 2 hours, 17 parts by weight of high molecular weight polyethylene was obtained based on each hundred parts by weight of vehicle. Similar results are obtained using such other solvents as toluene, chlorobenzene, benzene, chlorohexane, hexane, mineral oil, or Stoddard solvent.

Thus by means of this invention polyethylene is readily produced in improved color using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffess and the like, the polymers embodying this invention can be treated in similar manner to those obtained by other processes.

Although the invention has been described in considerable detail with reference to certain preferred embodiments thereof, variations and modifications can be effected within the spirit and scope of this invention as described hereinabove and as defined in the appended claims.

I claim:

1. In the polymerization of α-monoolefinic hydrocarbon material from the group consisting of ethylene and propylene to form solid polymer, the improvement which comprises catalyzing the polymerization with a catalytic mixture in a molar ratio of from 1:4 to 4:1 of a titanium tetraalkoxide wherein each alkoxide group contains 1–4 carbon atoms and a monoalkyl aluminum dihalide wherein the alkyl group contains 1–12 carbon atoms and the halogen atoms are from the group consisting of chlorine and bromine, and thereby forming a solid high molecular weight polymer of improved color.

2. In the polymerization of at least one monoolefin from the group consisting of ethylene and propylene to form solid polymer, the improvement which comprises polymerizing said monoolefin at a temperature of from −60° to 200° C. in liquid dispersion in an inert organic liquid and in the presence of 0.1–4% by weight based on said liquid of a catalytic mixture in a molar ratio of from 1:4 to 4:1 of titanium tetrabutoxide and monoalkyl aluminum dichloride wherein the alkyl group contains 1–12 carbon atoms, and thereby forming a solid high molecular weight polymer of improved color.

3. In the polymerization of at least one monoolefin from the group consisting of ethylene and propylene to form solid polymer, the improvement which comprises polymerizing said monoolefin at a temperature of from −60° to 200° C. in liquid dispersion in an inert organic liquid and in the presence of 0.1–4% by weight based on said liquid of a catalytic mixture in a molar ratio of from 1:4 to 4:1 of titanium tetrabutoxide and monoalkyl aluminum dibromide wherein the alkyl group contains 1–12 carbon atoms, and thereby forming a solid high molecular weight polymer of improved color.

4. In the polymerization of at least one monoolefin from the group consisting of ethylene and propylene to form solid polymer, the improvement which comprises polymerizing said monoolefin at a temperature of from −60° to 200° C. in liquid dispersion in an inert organic liquid and in the presence of 0.1–4% by weight based on said liquid of a catalytic mixture in a molar ratio of from 1:4 to 4:1 of titanium tetramethoxide and monoalkyl aluminum dichloride wherein the alkyl group contains 1–12 carbon atoms and thereby forming a solid high molecular weight polymer of improved color.

5. In the polymerization of at least one monoolefin from the group consisting of ethylene and propylene to form solid polymer, the improvement which comprises polymerizing said monoolefin at a temperature of from −60° to 200° C. in liquid dispersion in an inert organic liquid and in the presence of 0.1–4% by weight based on said liquid of a catalytic mixture in a molar ratio of from 1:4 to 4:1 of titanium tetraethoxide and monoalkyl aluminum dichloride wherein the alkyl group contains 1–12 carbon atoms and thereby forming a solid high molecular weight polymer of improved color.

6. In the polymerization of at least one monoolefin from the group consisting of ethylene and propylene to form solid polymer, the improvement which comprises polymerizing said monoolefin at a temperature of from −20° to 130° C. in liquid dispersion in an inert liquid hydrocarbon vehicle and in the presence of from 0.1 to 4% by weight based on said vehicle of a catalytic mixture of titanium tetrabutoxide and aluminum methyl dibromide, the molar ratio of said titanium tetrabutoxide to said aluminum methyl dibromide being in the range of from 1:4 to 4:1.

7. In the polymerization of at least one monoolefin from the group consisting of ethylene and propylene to form solid polymer, the improvement which comprises polymerizing said monoolefin at a temperature of from −20° to 130° C. in liquid dispersion in an inert liquid hydrocarbon vehicle and in the presence of from 0.1 to 4% by weight based on said vehicle of a catalytic mixture of titanium tetraethoxide and aluminum methyl dichloride, the molar ratio of said titanium tetraethoxide to said aluminum methyl dichloride being in the range of from 1:4 to 4:1.

8. In the polymerization of at least one monoolefin from the group consisting of ethylene and propylene to form solid polymer, the improvement which comprises polymerizing said monoolefin at a temperature of from −20° to 130° C. in liquid dispersion in an inert liquid hydrocarbon vehicle and in the presence of from 0.1 to 4% by weight based on said vehicle of a catalytic mixture of titanium tetrabutoxide and aluminum butyl dichloride, the molar ratio of said titanium tetrabutoxide to said aluminum butyl dichloride being in the range of from 1:4 to 4:1.

9. In the polymerization of at least one monoolefin from the group consisting of ethylene and propylene to form solid polymer, the improvement which comprises polymerizing said monoolefin at a temperature of from −20° to 130° C. in liquid dispersion in an inert liquid hydrocarbon vehicle and in the presence of from 0.1 to 4% by weight based on said vehicle of a catalytic mixture of titanium tetraethoxide and aluminum ethyl dichloride, the molar ratio of said titanium tetraethoxide to said aluminum ethyl dichloride being in the range of from 1:4 to 4:1.

10. The process which comprises progressively introducing into a polymerization zone a polymerization mixture of substantially constant composition comprising an inert organic liquid vehicle, α-monoolefinic hydrocarbon material from the group consisting of ethylene and propylene in a concentration soluble in said vehicle, and from 0.1 to 4% by weight based on said vehicle of a catalytic mixture in a molar ratio of from 1:4 to 4:1 of a titanium tetraalkoxide wherein each alkoxide group contains 1–4 carbon atoms and a monoalkyl aluminum dihalide wherein the alkyl group contains 1–4 carbon atoms and the halogen atoms are from the group consisting of chlorine and bromine, maintaining said polymerization mixture in said zone in liquid dispersion at a substantially constant temperature in the range of from −60° C. to 200° C. and for a time sufficient for substantial formation of solid polymer, and progressively withdrawing the resulting mixture from said zone in amounts correlated to the introduction of said polymerization mixture whereby the relative proportions of the various components in said zone remain substantially unchanged during the process.

11. The process which comprises progressively and continuously introducing into a polymerization zone at a substantially constant rate a polymerization mixture of substantially uniform composition comprising an inert liquid hydrocarbon vehicle, at least one monoolefin from the group consisting of ethylene and propylene in a concentration soluble in said vehicle, and from 0.1 to 4% by weight based on said vehicle of a catalytic mixture of a titanium tetraalkoxide wherein each alkoxide group contains 1–4 carbon atoms and a monoalkyl aluminum dihalide wherein the alkyl group contains 1–12 carbon atoms and the halogen atoms are from the group consisting of chlorine and bromine, the molar ratio of said titanium tetraalkoxide to said monoalkyl aluminum dihalide being in the range of from 1:4 to 4:1, maintaining said polymerization mixture in said zone in liquid dispersion at a substantially constant temperature in the range of from 25° C. to 130° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

12. The process which comprises progressively and continuously introducing into a polymerization zone at a substantially constant rate a polymerization mixture of substantially uniform composition comprising an inert liquid hydrocarbon vehicle, at least one monoolefin from the group consisting of ethylene and propylene in a concentration soluble in said vehicle, and from 0.1 to 4% by weight based on said vehicle of a catalytic mixture of titanium tetrabutoxide and aluminum methyl dibromide, the molar ratio of said titanium tetrabutoxide to said aluminum methyl dibromide being in the range of from 1:4 to 4:1, maintaining said polymerization mixture in said zone in liquid dispersion at a substantially constant temperature in the range of from 25° C. to 130° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

13. The process which comprises progressively and continuously introducing into a polymerization zone at a substantially constant rate a polymerization mixture of substantially uniform composition comprising an inert liquid hydrocarbon vehicle, at least one monoolefin from the group consisting of ethylene and propylene in a concentration soluble in said vehicle, and from 0.1 to 4% by weight based on said vehicle of a catalytic mixture of titanium tetraethoxide and aluminum methyl dichloride, the molar ratio of said titanium tetraethoxide to said aluminum methyl dichloride being in the range of from 1:4 to 4:1, maintaining said polymerization mixture in said zone in liquid dispersion at a substantially constant temperature in the range of from 25° C. to 130° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

14. The process which comprises progressively and continuously introducing into a polymerization zone at a substantially constant rate a polymerization mixture of substantially uniform composition comprising an inert liquid hydrocarbon vehicle, at least one monoolefin from the group consisting of ethylene and propylene in a concentration soluble in said vehicle, and from 0.1 to 4% by weight based on said vehicle of a catalytic mixture of titanium tetrabutoxide and aluminum butyl dichloride, the molar ratio of said titanium tetrabutoxide to said aluminum butyl dichloride being in the range of from 1:4 to 4:1, maintaining said polymerization mixture in said zone in liquid dispersion at a substantially constant temperature in the range of from 25° C. to 130° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

15. The process which comprises progressively and continuously introducing into a polymerization zone at a substantially constant rate a polymerization mixture of substantially uniform composition comprising an inert liquid hydrocarbon vehicle, at least one monoolefin from the group consisting of ethylene and propylene in a concentration soluble in said vehicle, and from 0.1 to 4% by weight based on said vehicle of a catalytic mixture of titanium tetraethoxide and aluminum ethyl dichloride, the molar ratio of said titanium tetraethoxide to said aluminum ethyl dichloride being in the range of from 1:4 to 4:1, maintaining said polymerization mixture in said zone in liquid dispersion at a substantially constant temperature in the range of from 25° C. to 130° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

References Cited in the file of this patent

UNITED STATES PATENTS

| | | |
|---|---|---|
| 2,440,498 | Young et al. | Apr. 27, 1948 |
| 2,587,562 | Wilson | Feb. 26, 1952 |
| 2,721,189 | Anderson et al. | Aug. 30, 1954 |

Notice of Adverse Decision in Interference

In Interference No. 89,806 involving Patent No. 2,833,755, H. W. Coover, Jr., Preparation of polyolefins of improved color by catalytic polymerization with a titanium tetraalkoxide and a monoalkyl aluminum dihalide, final judgment adverse to the patentee was rendered June 28, 1962, as to claims 1, 2, 3, 10 and 11.

[*Official Gazette October 16, 1962.*]